United States Patent [19]

Cribbs et al.

[11] 3,714,632

[45] Jan. 30, 1973

[54] CHARACTER RECOGNITION METHOD AND SYSTEM WITH STROBE CONTROL

[75] Inventors: John A. Cribbs, Atlanta; Arthur B. Abeling, Decatur; Kenneth H. Breeden, Doraville, all of Ga.

[73] Assignee: Data Card Corporation, Minneapolis, Minn.

[22] Filed: March 30, 1971

[21] Appl. No.: 129,341

[52] U.S. Cl.....................340/146.3 WD, 235/61.11 R

[51] Int. Cl. ....................G06r 9/18

[58] Field of Search...340/146.3 Z, 146.3 R, 146.3 J, 340/146.3 AH, 146.3 K, 146.3 C, 146.3 WD; 235/61.11 C

[56] References Cited

UNITED STATES PATENTS

| | | | |
|---|---|---|---|
| 3,262,099 | 7/1966 | Skiko et al. | 340/146.3 R |
| 3,299,298 | 1/1967 | Schinner | 235/61.11 C |
| 3,542,979 | 11/1970 | Collier | 235/61.11 C |
| 3,531,770 | 9/1970 | Mauch et al. | 340/146.3 J |

*Primary Examiner*—Thomas A. Robinson

*Attorney*—Irons, Sears, Staas, Halsey and Santorelli

[57] ABSTRACT

A character recognition method and system performs dynamic analysis of information derived in scanning characters for character identification. A linear array of plural sensors scans characters to be recognized in a corresponding plurality of horizontal scan paths. Each sensor produces an output responsive to and identifying the presence or absence of a character segment in its corresponding scan path. One or more successive sets of conditions result in scanning of each character in accordance with a change in the output condition of any sensor. A strobe pulse is generated in response to these changes. Decoding means enabled by the strobe pulse and responsive to the sensor outputs for at least selected sets of conditions define corresponding states upon the occurrence of the respectively associated sets of conditions. The states as thus defined and derived in scanning a character then are processed by logic means in accordance with prescribed sequences of occurrence for identification of the scanned character.

16 Claims, 12 Drawing Figures

| | SETS OF CONDITIONS | | | | | SELECTED SETS OF CONDITIONS | | STATES | |
|---|---|---|---|---|---|---|---|---|---|
| CHARACTERS | 1 | 2 | 3 | 4 | 5 | 1 | 2 | 1 | 2 |
| 0 | ABCDE | $A\bar{B}\bar{C}\bar{D}E$ | ABCDE | — | — | ⒶBCDⒺ | $A\bar{B}\bar{C}\bar{D}E$ | Y | M |
| 1 | $\bar{A}\bar{B}\bar{C}\bar{D}E$ | $A\bar{B}\bar{C}\bar{D}E$ | ABCDE | $\bar{A}\bar{B}\bar{C}\bar{D}E$ | — | $\bar{A}\bar{B}\bar{C}\bar{D}E$ | — | K | — |
| 2 | $A\bar{B}CDE$ | $A\bar{B}C\bar{D}E$ | $ABC\bar{D}E$ | — | — | $A\bar{B}CDE$ | $ABC\bar{D}E$ | T | S |
| 3 | $A\bar{B}\bar{C}\bar{D}E$ | $A\bar{B}C\bar{D}E$ | ABCDE | — | — | $A\bar{B}\bar{C}\bar{D}E$ | $A\bar{B}C\bar{D}E$ | M | P |
| 4 | $ABC\bar{D}\bar{E}$ | $\bar{A}\bar{B}C\bar{D}\bar{E}$ | ABCDE | $\bar{A}\bar{B}C\bar{D}\bar{E}$ | — | ⒶBC$\bar{D}\bar{E}$ | $\bar{A}\bar{B}C\bar{D}\bar{E}$ | W | J |
| 5 | $ABC\bar{D}E$ | $A\bar{B}C\bar{D}E$ | $A\bar{B}CDE$ | — | — | $A\bar{B}C\bar{D}E$ | $A\bar{B}CDE$ | P | T |
| 6 | ABCDE | $\bar{A}\bar{B}C\bar{D}E$ | $\bar{A}\bar{B}CDE$ | — | — | $\bar{A}\bar{B}$CⒹE | — | R | — |
| 7 | $A\bar{B}\bar{C}\bar{D}\bar{E}$ | ABCDE | — | — | — | $A\bar{B}\bar{C}\bar{D}\bar{E}$ | — | I | — |
| 8 | $AB\bar{C}DE$ | ABCDE | $A\bar{B}\bar{C}\bar{D}E$ | ABCDE | $AB\bar{C}DE$ | ⒶBⒸDⒺ | $A\bar{B}C\bar{D}E$ | Z | P |
| 9 | $ABC\bar{D}\bar{E}$ | $A\bar{B}C\bar{D}\bar{E}$ | ABCDE | — | — | $A\bar{B}C\bar{D}E$ | — | L | — |
| SPACE | $\bar{A}BCD\bar{E}$ | | | | | | | U | |

INVENTORS
JOHN A. CRIBBS
ARTHUR B. ABELING
KENNETH H. BREEDEN

BY
Brufsky, Staas, Breiner & Halsey
ATTORNEYS

| CHARACTERS | SETS OF CONDITIONS | | | | | SELECTED SETS OF CONDITIONS | | STATES | |
|---|---|---|---|---|---|---|---|---|---|
| | 1 | 2 | 3 | 4 | 5 | 1 | 2 | 1 | 2 |
| 0 | $ABCDE$ | $A\bar{B}\bar{C}\bar{D}E$ | $ABCDE$ | — | — | Ⓐ$BCD$Ⓔ | $A\bar{B}\bar{C}\bar{D}E$ | Y | M |
| 1 | $\bar{A}\bar{B}\bar{C}\bar{D}E$ | $A\bar{B}\bar{C}\bar{D}E$ | $ABCDE$ | $\bar{A}\bar{B}\bar{C}\bar{D}E$ | — | $\bar{A}\bar{B}\bar{C}\bar{D}E$ | — | K | — |
| 2 | $A\bar{B}CDE$ | $A\bar{B}C\bar{D}E$ | $ABC\bar{D}E$ | — | — | $A\bar{B}CDE$ | $ABC\bar{D}E$ | T | S |
| 3 | $A\bar{B}\bar{C}\bar{D}E$ | $A\bar{B}C\bar{D}E$ | $ABCDE$ | — | — | $A\bar{B}\bar{C}\bar{D}E$ | $A\bar{B}C\bar{D}E$ | M | P |
| 4 | $ABC\bar{D}\bar{E}$ | $\bar{A}\bar{B}C\bar{D}\bar{E}$ | $ABCDE$ | $\bar{A}\bar{B}C\bar{D}\bar{E}$ | — | Ⓐ$BC\bar{D}\bar{E}$ | $\bar{A}\bar{B}C\bar{D}\bar{E}$ | W | J |
| 5 | $ABC\bar{D}E$ | $A\bar{B}C\bar{D}E$ | $A\bar{B}CDE$ | — | — | $A\bar{B}C\bar{D}E$ | $A\bar{B}CDE$ | P | T |
| 6 | $ABCDE$ | $\bar{A}\bar{B}C\bar{D}E$ | $\bar{A}\bar{B}CDE$ | — | — | $\bar{A}\bar{B}C$Ⓓ$E$ | — | R | — |
| 7 | $A\bar{B}\bar{C}\bar{D}\bar{E}$ | $ABCDE$ | — | — | — | $A\bar{B}\bar{C}\bar{D}\bar{E}$ | — | I | — |
| 8 | $AB\bar{C}DE$ | $ABCDE$ | $A\bar{B}C\bar{D}E$ | $ABCDE$ | $AB\bar{C}DE$ | Ⓐ$B$Ⓒ$D$Ⓔ | $A\bar{B}C\bar{D}E$ | Z | P |
| 9 | $ABC\bar{D}\bar{E}$ | $A\bar{B}C\bar{D}\bar{E}$ | $ABCDE$ | — | — | $A\bar{B}C\bar{D}E$ | — | L | — |
| SPACE | $\bar{A}\bar{B}\bar{C}\bar{D}\bar{E}$ | | | | | | | U | |

FIG. 3

Patented Jan. 30, 1973 3,714,632

5 Sheets-Sheet 5

CHARACTER RECOGNITION METHOD AND SYSTEM WITH STROBE CONTROL

BACKGROUND OF THE INVENTION

1. Field of the Invention

This invention relates to character recognition methods and systems and, more particularly, to a method and system wherein character information derived in scanning a character is dynamically analyzed by decoding and logic circuitry for identification of the scanned character.

2. State of the Prior Art

Numerous systems and methods have been proposed heretofore for the automated recognition of characters of both machine readable and visually recognizable types. Many prior art systems require obtaining data relating to the entire configuration of an unknown character which is stored and subsequently processed for ultimate identification of the character. For example, some prior art systems provide for optically projecting an image of the unknown character onto a mosaic, or matrix array, of sensing devices such as photocells. The output of the array of sensors is then compared with a plurality of matrices corresponding to known characters and each having stored therein a recognition pattern. A match between the output of the sensor array, responsive to the image of the unknown character, and the stored information of one of the matrices then provides character recognition. Such techniques require accurate alignment of the image of the unknown character on the sensor array if recognition is to be achieved. Various shadow mask comparison techniques are also known which operate on a similar principle.

Another technique that has been proposed heretofore is that of curve tracing, such as with a flying spot scanner cathode ray tube which operates essentially to trace the configuration of the character. Data relating to line lengths, curves or discontinuities, e.g., angles and intersections and the like in the scanned character, is derived and compared with stored, similarly derived data for known characters for identification.

Various complex digital processing techniques also have been proposed for performing a closely analogous function. In these, a plurality of scanning elements which may be disposed, for example, in a linear array, are caused to scan an unknown character in a predetermined direction. The outputs of the elements are gated into various storage registers as the scan proceeds, in accordance with predetermined time intervals. Such systems require complex processing circuitry for comparing signals from the various scanning elements with one another to identify continuous or discontinuous lines and intersections and the like.

Another technique proposed heretofore in the art is that of scanning the unknown characters, such as with a linear array of scanning elements, and simply counting certain predetermined events or characteristics which occur during the scan, for example, each time a line of scan intersects a segment of the character. Some such systems distinguish between intersections of long duration and ones of shorter duration and define corresponding, separate counts. The counts thus accumulated may simply be compared with stored such signals corresponding to known characters for achieving the identification, or recognition, of the unknown character. Alternatively, the counts may be subjected to further processing, or utilized as a control function such as in generating a digital pulse train, which then is further processed for ultimate analysis or comparison operations in achieving character recognition.

The prior art systems heretofore have all suffered from one or more of various defects. Many systems are exceedingly complex and correspondingly excessively expensive, while others, less complex and less expensive, afford inadequate reliability. Most systems require precise timing and synchronized control to establish scanning intervals in deriving character information for analysis. This requires transporting the medium in which the characters are presented through a scanning or sensing station at a precisely controlled speed for achieving adequate and reliable sensing of data from the scanned character. Many such systems furthermore require that the characters be of precise widths and that the characters be precisely spaced apart. Still other systems require that the boundaries of each unknown character first be determined before the scanning and recognition operations are initiated. Such requirements of course reduce the versatility of such systems, and the accuracy of recognition. These and other defects of prior art systems are overcome by the method and apparatus of the present invention.

SUMMARY OF THE INVENTION

This invention comprises an improvement in the invention of Raymond J. Deschenes as set forth and claimed in his patent application Ser. No. 128,387, filed Mar. 26, 1971 entitled "Character Recognition Method and System" filed concurrently herewith and assigned to the common assignee. In accordance with that invention, a linear array of plural sensing elements, or sensors, is caused to scan the characters to be recognized along a corresponding plurality of horizontal scan lines. Each sensor produces output signals identifying the presence or absence of a character segment in its corresponding scan path. A first set of output conditions for the plurality of sensors is defined when the output condition of any thereof identifies the presence of a character segment in its scan path. A successive set of such conditions is defined for each successive occurrence of a change in the output condition of any of the sensors. Thus, as each sensor of the plurality thereof responds to a new condition, i.e., either in making a transition from sensing background to sensing of a segment of the unknown character, or vice versa, the change in the condition of that one sensor or of one or more sensors simultaneously, thus defines a new set of conditions as occurring in the scan of the character. Each such set of conditions defines a corresponding state. The successive sets of conditions resultant from scanning of the character thus define successive states.

In the apparatus of the system, logic decoding gates respond to the outputs of the sensors to define corresponding states in accordance with preselected sets of conditions. It is significant to note that no arbitrary timing intervals are imposed in effecting scanning or deriving the sets of conditions; rather, the character configuration itself defines the changes of the conditions and thus defines the new sets thereof and the corresponding sequence of states and state changes. Further, logic recognition means respond to the outputs of the decoders for processing the thus defined, states in the sequence in which they occur, and thereby immediately provide an output identifying the unknown character as one of a group of known characters which the system is designed to recognize.

Various sets of conditions may result in scanning a given character, depending upon the character, its font style, and the number of sensors employed. A large number of such sensing conditions may thus be defined, although a relatively small number is adequate to provide highly reliable character recognition in accordance with the present invention. In practice, a limited number of the sets of sensing conditions is usually employed out of the total available. This is done not only to reduce the amount of processing circuitry employed, but also for eliminating any sets of conditions in which uncertainties may exist as the result of the mechanics of the sensing or scanning apparatus and/or the specific character configurations. Decoders are thus provided for the selected sets of conditions to establish the various states employed in the recognition processing. In addition, a decoder is provided for generating a state output identifying the set of output conditions of the plurality of sensors corresponding to the absence of any character segment in any of the scan paths, as occurs in the space between characters. The space set is utilized for various control and error checking functions as hereinafter detailed.

It is significant to note that the selection of sets of conditions need not be of sets which are unique to each of the plurality of characters to be recognized but, in fact, the same set or sets may be employed more than once for a given character, or for two or more different characters. This is permitted, since the logic recognition circuits require not only predetermined combinations of states to occur for recognition of the characters, but also that these states occur in a predetermined sequence.

The present invention provides a strobe or timing control of the logic decoding and processing functions of the character recognition method and system as above described. More specifically, the present invention provides for responding to a change in any of the sensor output conditions to produce, a time delay period thereafter, a strobe pulse. The time delay is selected, in accordance with various factors hereinafter detailed, to assure that the plurality of sensors have all had sufficient time to stabilize in their respective conditions for accurately defining the sets of conditions. The logic decoding of the sensor output conditions is enabled upon receipt of the strobe signal.

For generating the strobe signal, a differentiator is provided for each of the sensor outputs, and which generates a spike-type signal, i.e., a pulse of short duration upon any change in the output condition of any sensor. Thus, a condition change signal is generated for each successive set of conditions, upon detecting the first change in a sensor output condition for the successive sets of conditions.

The differentiator outputs providing condition change signals are supplied to an OR gate, the output of which is applied to a timing circuit. A predetermined time after receipt of the condition change signal, the timing circuit generates a strobe pulse, also of short duration. The timing circuit thus affords both the delay, for the purpose above described, and also effectively responds to only the first such condition change signal received from the sensors upon the occurrence of each change of a set of conditions. Further, generation of the strobe is inhibited during a space state, thereby eliminating response to spurious signals appearing as changes in sensor output conditions.

The strobe technique functions to provide greater reliability of recognition by reducing the tolerance requirements for the character presentation and configuration, as well as the criticality of response of the sensors and the operating intervals of the logic decoding and processing means. Thus, characters which are skewed from normal position transverse to the scan paths, or the segments of which have imperfect edges, all of which may result in non-simultaneous response of the sensors, will not produce erroneous change of state indications. Rather, the delayed strobe affords sufficient time to assure that all sensors are responding to a reliable portion of a character segment in the scan path which will assure an accurate indication of the set of conditions before the set is decoded to provide a state output. Additionally, the delayed strobe eliminates problems associated with transients, for example, contact bounce or switching transients, which may result as the sensor outputs change conditions.

As is apparent from the foregoing, the decoding functions and the logic recognition processing proceed substantially simultaneously with the sensing of the corresponding sets of conditions. As a result, recognition is achieved substantially concurrently with the completion of scanning a character. The dynamic analysis of the scanned character information furthermore reduces data storage provisions as required in prior art systems, reducing complexity and cost of the system. Strobe control of such a system, as provided for by the present invention, assures reliability of the sensing and processing functions, affording greater reliability and operating speed while reducing the tolerance requirements on the configurations of the characters to be scanned and recognized.

Accordingly, the method and apparatus of the invention are greatly simplified in comparison to the prior art, yet provide highly reliable and rapid automatic character recognition.

BRIEF DESCRIPTION OF THE DRAWINGS

FIG. 3 comprises a first table indicating, for each of the characters of FIG. 1 and the sensor output conditions derived therefrom as presented in FIG. 2, the sets of conditions resultant from the scanning, assuming the scanning to proceed from left to right, or alternatively, the characters to be moved from right to left while the scan means is held in a stationary position, a second table indicating selected sets of conditions to be utilized in the logic recognition operations for character identification, and a third table indicating the states corresponding to the selected sets of conditions of the second table, and the sequence in which the states must occur to identify the corresponding characters;

DETAILED DESCRIPTION OF THE INVENTION

Figure 1:
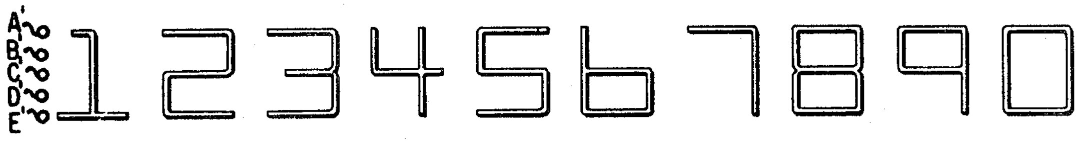
FIG. 1 is a representation of characters to be read by a system and method in accordance with the invention and includes a representation of the scan line or scan positions of a plurality of scanning elements or sensors, utilized to convert the character images into sensing signals.

The invention is discussed herein in relation to recognizing characters which are presented in FIG. 1 in a manner corresponding to the well-known Farrington 7B font. These characters are essentially of the match stick variety and are comprised of essentially seven straight line portions or match sticks. These seven portions comprise upper, lower, and middle horizontal sticks, upper and lower left, and upper and lower right vertical sticks. In general, reference to the numeral, or character, "8" illustrates the totality of the seven line segment font. For ease of visual recognition, however, various contouring effects are presented in the character configuration for closer resemblance to conventional characters. For example, the corners are rounded a bit and a "waist" is provided at the junction of the vertical segments and both ends of the horizontal segment of the numeral "8." Other similar modifications are apparent in the other numerals. Notably, "1" has a small flag extending to the left, as to the numeral "3," the horizontal bar is foreshortened and a "waist" effect and rounding of corners provided, and as to the numeral "4," the continuous vertical line formed by the upper and lower right vertical segments is shifted to the left for more conventional appearance and to assist in distinguishing a 4 from a 9, for example.

Figure 2:
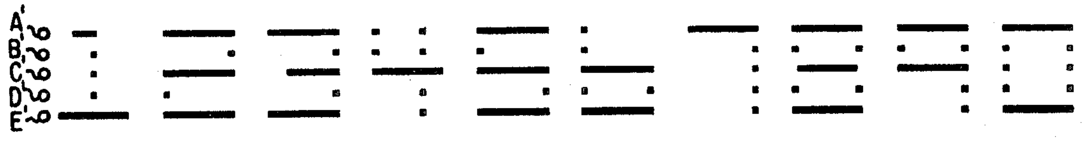
FIG. 2 is a diagrammatic representation of the sensing or output signals of the sensors employed in the scanning operation represented in FIG. 1, the heavy lines defining the character segments lying in the scan paths of the sensors.

These variations from a precise seven line segment font in the illustrative set of characters of FIGS. 1 and 2 are noted since they do present difficulties of recognition, particularly in prior art apparatus. In the recognition method and apparatus of the invention, however, these variations are processed without any difficulty and present no factor of unreliability in the recognition operations. From the foregoing and the following detailed description of the invention, however, it will be apparent that characters of other fonts, and not limited to numeric but including alpha numeric characters as well, can be recognized by the system of the invention. For purposes of present discussion, however, the invention will be described in the context of recognizing the numeral characters of the font illustrated in FIG. 1.

FIG. 1 also includes a schematic representation of five scanning elements, or sensors, and their respectively associated horizontal scanning paths, the elements being identified by the letters A',B', C', D', and E'. In FIG. 2, there is illustrated the response of the five scanning elements to the scanning of these characters. It is assumed that the characters are of equal height and the vertical displacement of the scanning elements A' and E', and thus their associated scan paths, correspond thereto. It is also assumed that the middle scanning element C' and its associated scan path corresponds with the middle horizontal stick or line segment of the specified font style. The outputs or responses of the scanning elements A' through E', assuming relative horizontal movement of these elements and the characters to be recognized, are thus illustrated by heavy dark lines corresponding to the intersection or coincidence of the respective scan paths of those elements and the segments or portions of the characters.

FIG. 3 comprises three tables, the first entitled "Sets of Conditions," the second entitled "Selected Sets of Conditions," and the third entitled "States." In general, in accordance with the invention, a set of conditions comprises, or is defined to mean, a specific combination of output conditions of the plurality of sensing elements A' through E' encountered in scanning each character of a class. Here, the set of characters comprises the numerals "1" through "9" and "0." Differing numbers of sets of conditions are derived in the scanning of these various numerals, the maximum being five such sets for the numeral "8" and the minimum being two such sets for the numeral "7."

In the tables of FIG. 3, such as the first, entitled "Sets of Conditions," the letters A through E are utilized in a conventional Boolean algebra sense to correspond to the conditions of the sensing elements A' through E' encountered in effecting their respective scans as illustrated and discussed in relation to FIGS. 1 and 2. More particularly, the symbols $\overline{A}$ through $\overline{E}$ define the sensing of a character segment and thus correspond to the heavy line portions in FIG. 2. The symbols A through E correspond to the absence of scanning of character segments and thus to the locations in the respectively corresponding scan paths of the elements A' through E' in which the elements are not sensing a segment of a character.

The sets of conditions which obtain in scanning each of the characters 1–9 and 0 is thus set forth in the first table of FIG. 3 and may be compared directly with the scan indications in FIG. 2. It is important to note that the sets of conditions occur in a sequence uniquely related to and directly defined by the configuration of each character. That is, each set of conditions is established as a direct result of the scanning operation. Further, a new set is defined when the condition of any one or more of the scanning elements A′ through E′ changes.

For example, the numeral 1 defines four sets of conditions. The first set, $\bar{A}\ \bar{B}\ \bar{C}\ \bar{D}\ E$ is that of the condition E being true, i.e., the scanning element E; and no other scanning element, has detected a portion of the unknown character and which, in reference to FIGS. 1 and 2, comprises the lower horizontal bar of the numeral 1. When the flag portion of the top of the numeral 1 is detected by the element A′, a new set of conditions $A\ \bar{B}\ \bar{C}\ \bar{D}\ E$ obtains. Similarly, when the vertical bar is detected by elements B′, C′, and D′— which occurs simultaneously with the continuation of the sensing condition for elements A′ and E′, the set A B C D E obtains. Finally, only the condition E remains true after passing beyond the vertical line segments of the "1" and thus a further, and here, final set $\bar{A}\ \bar{B}\ \bar{C}\ \bar{D}\ E$ is defined.

Note particularly that the various sets of conditions are independent of the duration of these conditions and further that the recognition of these various sets relates entirely to the actual scanning of the configuration of the character and is not imposed by any arbitrary timing function. Further, assuming the same general relationship of the segments of each character, these identical states will obtain regardless of width variations, whether of a random or uniform nature with respect to the individual characters of the set.

In the table entitled "Selected Sets of Conditions," there are listed first and second sets of conditions for each of the characters 1–9 and 0 which are utilized in the disclosed system for character identification. The basis of the selection of the sets is primarily that of maximizing the distinctions between the respectively corresponding states which are utilized in the logic recognition circuitry for character identification. Selecting sets of conditions with maximum distinctions therebetween assures maximum reliability despite eliminating, or not using, data which is available from the scanning operation. Reducing the number of states, of course, simplifies the circuitry and reduces costs. By virtue of the basic recognition system employed herein, it is possible to utilize but a single set of conditions and a corresponding single state and achieve unique character identification for most of the characters. For example, see the sets of conditions and corresponding states for the numerals 1, 6, and 7. Certain redundancy in the prescribed sequences of states for recognition, however, is desirable to assure reliability. Thus, in a majority of cases, a prescribed sequence of two states is provided for achieving identification.

In addition, even as to the selected sets of conditions, by judicious selection, certain of the sensor output conditions of a given set may be placed in a "don't care" category. "Don't care" conditions are identified in the table of selected conditions by a circle surrounding the condition representation, for example, the conditions A C E in the first set of conditions for the numeral "8." It is desirable to do so, to eliminate any uncertainty in sensing, such as that resultant from the curvature at the upper and lower corners of the 8 on the leading edge thereof. Note that neither the fourth state approaching the trailing edge of the "8," nor the first and fifth states having the conditions $A\ B\ \bar{C}\ D\ E$ corresponding to the "waist" of the "8" is employed in the prescribed sequence for recognition of an "8."

In FIG. 3 there is further provided a table entitled "-States." In operation and as will be hereinafter explained, these states are derived by logic decoding of the output conditions of the plurality of sensors in accordance with the selected sets thereof as set forth in the table of Selected Sets of Conditions. Each set of conditions defines a corresponding state, and like sets define like states. Note also that a new state results only when a new set of conditions obtains. In accordance with the selection of sets of conditions, a given state may occur only once for a given character, although the same state may be employed for different characters. For example, the state P is both the first state for the numeral "5" and the second state for the numerals "3" and "8."

A further set of conditions is also included in FIG. 3, corresponding to the absence of sensing of any portion of any character and thus to the location of the sensing elements preceding or following any character and intermediate any two characters. This is termed a space to distinguish from the character conditions, and corresponds to the condition $\bar{A}\ \bar{B}\ \bar{C}\ \bar{D}\ \bar{E}$. The space is processed by logic decoding means to define the state U. The state U is utilized for various purposes as hereinafter explained, for example, for identifying the completion of scanning of a character.

In relation to an earlier comment regarding the modifications in the configuration of the characters, consider the numeral 8. The numeral 8 defines identical first and fifth conditions, A B D E, C being absent due to the "waist." This assumes that the "waist" is detectable. Such an indentation in a practical application typically becomes clogged with dirt and is not reliably detectable. The manner for avoiding difficulties resulting therefrom is explained hereafter.

In the 7B font, only six items of information are required to uniquely identify each of the numerals 1–9 and 0. It is apparent from FIG. 3 that an amount of information well in excess of these minimal six items is afforded. Thus, substantial redundancy is available for reliability. This redundancy also permits elimination of states which may be uncertain, as well as placing uncertain sensor output conditions in the "don't care" category as above discussed.

As will more fully appear hereinafter, reliable and unique identification is assured since the logic recognition circuits operate in a sequential manner in accordance with the respectively associated prescribed sequences of states. By the selection shown in FIG. 3, each first state actually uniquely identifies a given character. Further, no two characters are identified by the same two states. With greater numbers of characters to be identified, however, such distinctions are not always available, and longer prescribed sequences may be required before recognition is achieved. In such longer sequences, and as discussed in the concurrently filed Deschenes application, the same states may appear but in different sequences for identifying a given character.

Consider, however, the state P. In the absence of states W or M having first appears, only the logic recognition means associated with the numeral $\bar{D}$ can respond, since only in that instance is the P state received in the prescribed sequence. Thus, receipt of the state P as the first state eliminates the probability of any other character being recognized, including "3" and "8." Considering further the recognition of "3" and "8," due to similarity of the derived data from scanning, a two state prescribed sequence is required to assure accurate recognition. By contrast, a single state sequence is selected for each of "1," "6," "7," and "9" due to selection of sets of conditions affording high reliability and accuracy of recognition.

Figure 4:
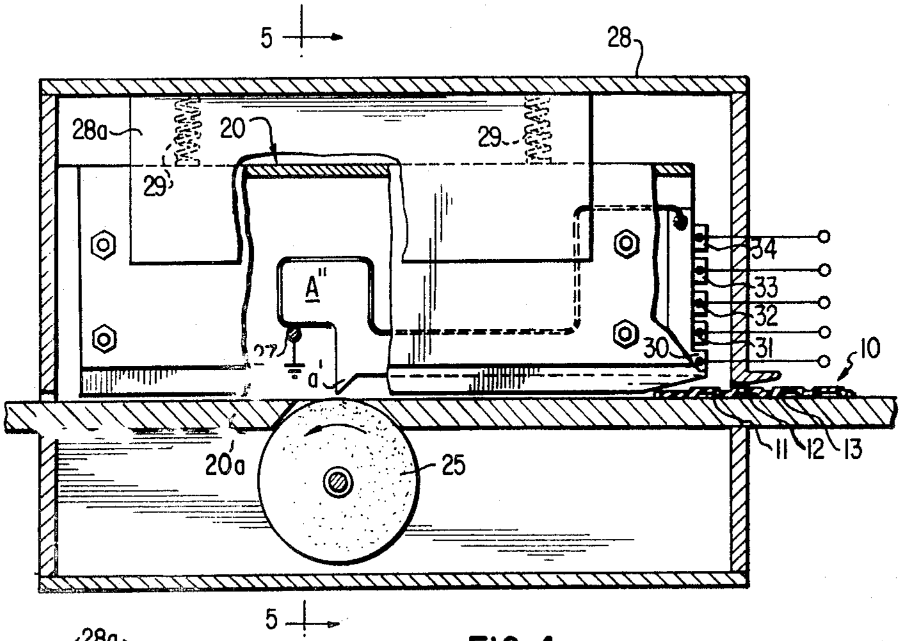
FIG. 4 is a planar view of a scan head suitable for use as the sensors employed in the present invention, and showing, in diagrammatic form, a character-bearing item to be advanced past the head for sensing of characters embossed thereon.

In FIG. 4 is illustrated a scanning head 20 suitable for use in the system of the invention and which comprises the separate invention of Allen Brock, as set forth and claimed in his application Ser. No. 128,379, filed Mar. 26, 1971 entitled "Electromechanical Read Head" filed concurrently herewith and assigned to the common assignee. The scan head 20 of FIG. 4 is ideally suited for scanning embossed characters such as are typically employed today with credit cards. Such a card is illustrated at 10 in FIG. 4 and includes raised numerals shown diagrammatically at 11, 12, and 13.

Figure 5:
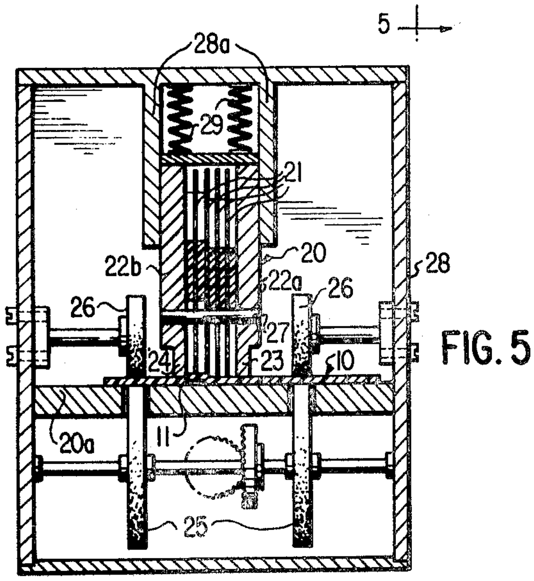
FIG. 5 is an end view of the read head of FIG. 4, additionally showing a drive mechanism for advancing the character-bearing item past the read head for sensing.

The scanning elements of the head 20 comprise a plurality of flexible arms A'', B'', C'', D'', and E'' corresponding to the scan elements A' through E' of FIGS. 1 and 2. Each of the elements A'' through E'' includes a wiper such as *a'* illustrated for the foremost element A'' seen in FIG. 4. Preferably, the scan elements are separated by low friction, non-conductive spacer sheets 21 of a material such as Mylar to permit freedom of vertical motion between the various elements and electrical insulation therebetween. The elements are stacked in parallel side by side relationship with the elements in aligned position between two supporting walls 22 which, for example, is of a relatively thicker and sturdy transparent Mylar material. As best seen in FIG. 5, the support elements **22*a* and 22*b* respectively include downwardly extending flanges or undercut portions 23 and 24 which engage the opposite top and bottom edges of the embossed characters of the card, as illustrated (for one edge) by the character 11 situated therebetween in FIG. 5**.

Preferably, the head 20 is received within a housing 28 in sliding engagement between downwardly extending flanges **28*a*. Resilient biasing means, such as springs 29, urge the head toward the support surface 20*a* on which the card 10 is received. Transport or drive means schematically illustrated by drive wheels 25 and associated idler rollers 26 engage the card 10 to transport it past the head 20**.

The inherent biasing of the resilient arms A'' through E'' cause them to normally engage the support rod 27. The rod 27 is of conductive material and is electrically connected to ground potential. Each of the elements A' through E' may be of conductive material or alternatively may include a conductive material on the edge thereof extending from the lower surface of the laterally extending portion which engages the rod 27 to corresponding output terminals 30 through 34. In operation, when the wiper of any element engages a character segment in its scan path, the element is raised, thereby breaking the electrical connection to the rod 27 and effecting a switching action to produce an electrical output signal.

Figures 6, 7:
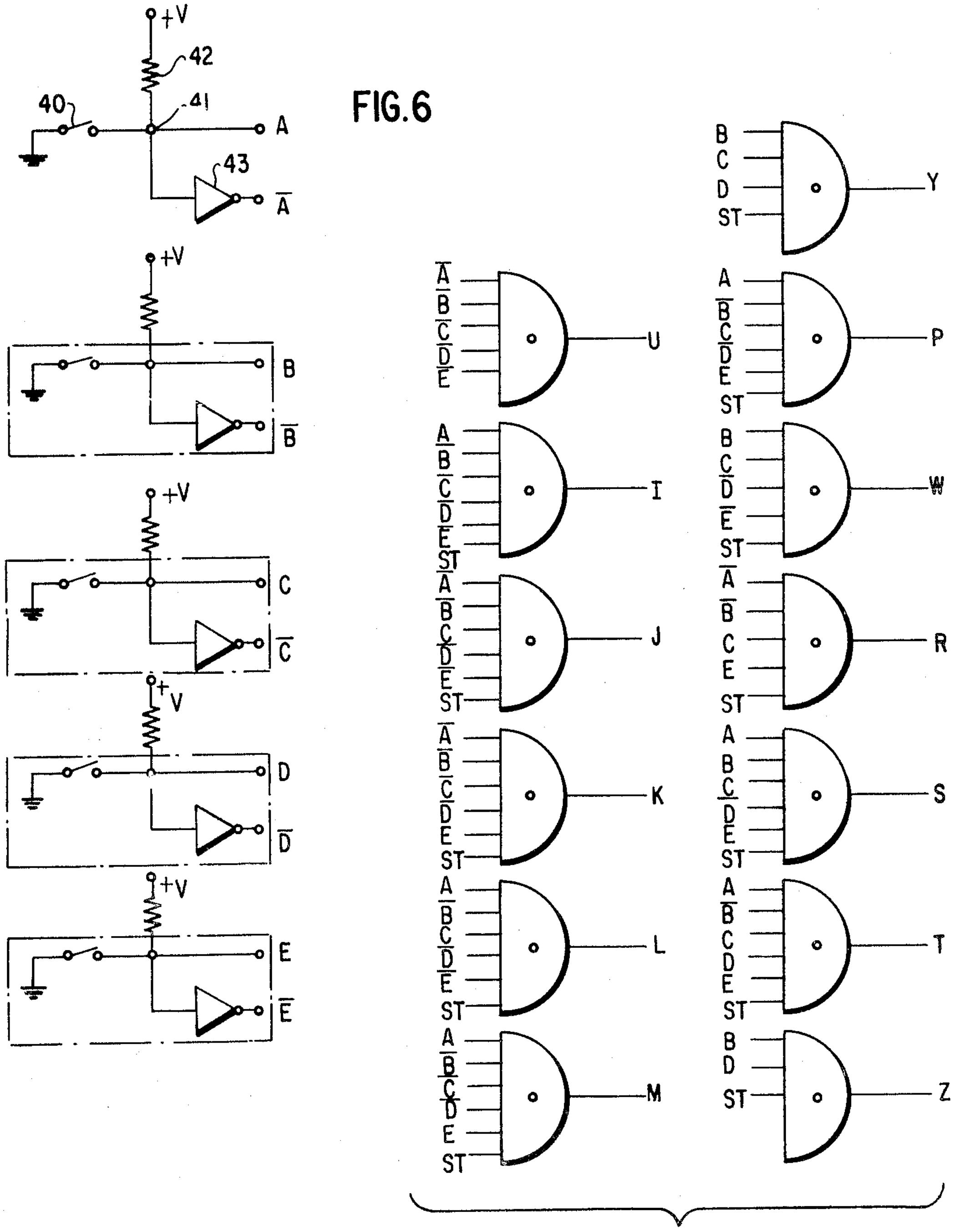
FIG. 6 shows a group of schematics of sensor elements comprising switching circuitry including switches corresponding to sensing elements of the type shown in FIGS. 4 and 5 and signal processing circuits associated with the outputs of the switches.
FIG. 7 shows a set of decoding logic gates for identifying states associated with selected sets of conditions derived in scanning characters.

In FIG. 6, there is shown a schematic of suitable switch circuitry utilized in providing electrical output signals indicating the sensing conditions A through E as well as the converse thereof, $\bar{A}$ through $\bar{E}$. Since each of these circuits may be identical, only the circuit for the output signals identifying the conditions A and $\bar{A}$ is shown.

The illustrative circuit includes a switch 40 connected at one terminal to ground and at the other terminal thereof to a junction 41, in turn connected through a resistor 42 to a positive potential source. Junction 41 is connected directly to an output terminal labelled A and through an inverter 43 to an output terminal labelled $\bar{A}$.

The switch 40 corresponds to the switching function of the switch element A'' in FIG. 4 and particularly the contact elements provided by the lower surface of the lateral arm *a''* and the contact rod 27, the latter being connected to ground. Switch 40 is normally closed, tying terminal 41 to ground and thus producing a zero or ground potential output.

Ground potential is defined as a logic "0." Inverter 43 inverts the ground potential output at junction 41 and produces a positive potential output at the terminal for condition $\bar{A}$. A positive potential defines a logic "1," or true, and thus indicates the condition $\bar{A}$ to be true. When the switch 40 opens, as when the element A'' is raised by engaging the embossed surface of a character, a positive potential appears at junction 41 corresponding to a logic "1" state, or a true condition for the output A and a false condition for the output $\bar{A}$.

It is apparent that any suitable technique for generation of the outputs in FIGS. 6 may be employed. Thus, optical scanning techniques or any of a number of other scanning techniques may be employed to generate the noted outputs. The structure of FIGS. 4 and 5 is merely illustrative of one suitable scanning technique.

In FIG. 7 is shown a plurality of decoding gates responsive to the respectively corresponding ones of the selected sets of conditions as set forth in the table of FIG. 3. As before noted, certain sets of conditions are not utilized and thus decoding gates are provided only for those selected sets. In particular, a decoding gate is provided for each of the states listed in the table of states in FIG. 3, including a decoding gate for the state U. For example, the first set of conditions for the character 1 is listed in the table of FIG. 3 as $\bar{A}\ \bar{B}\ \bar{C}\ \bar{D}$ E. The corresponding state is identified as state K. In FIG. 7 the decoder which produces an output state K thus receives the inputs $\bar{A}\ \bar{B}\ \bar{C}\ \bar{D}$ and E. The negation condition is, of course, of substantial informational content and thus is provided in the output of the switching circuitry in FIG. 6.

Further, in relation to the decoding gates of FIG. 7 and the reference to "don't care" conditions in FIG. 3, note that the Z state is defined by the set of two conditions B D, and the strobe condition ST. Here, the conditions A C E are in a "don't care" status; as is apparent from the inputs to the Z gate, regardless of whether any of A C E is true or false, if B D is true at the time of St, the Z state is defined.

Figure 8:
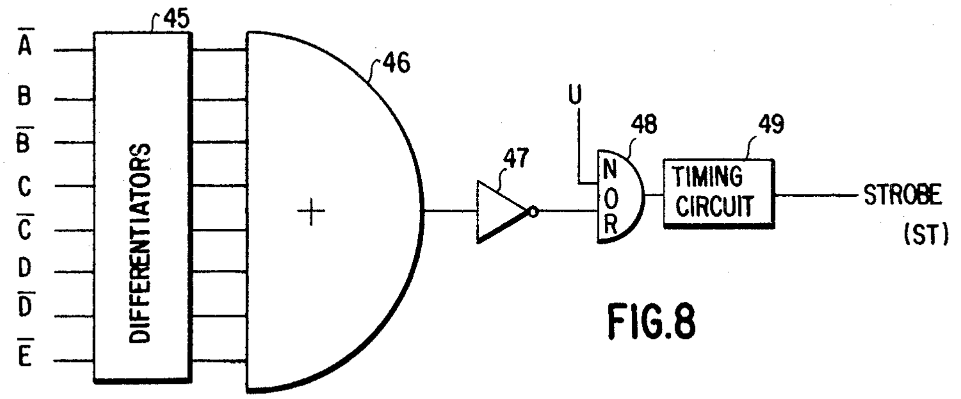
FIG. 8 is a logic diagram of a means for generating a strobe pulse in accordance with the invention.

In FIG. 8 is shown the means for generating the strobe pulse, shown in logic notation as the condition ST, and which is applied to each of the logic decoding gates. The circuit includes a differentiator circuit 45 to which are applied the sensor conditions derived from the switching circuitry of FIG. 6. The differentiators 45, shown in a single block diagram, include an independent circuit for each of the inputs thereto, and which generates a positive going spike or signal when the respectively associated state indicated at that input is attained.

Although each of the conditions A through E and its complement could be employed, for practical purposes, the conditions A and E are excluded at the input to the differentiators 45. The conditions A and E are not particularly reliable and therefore are rejected for purposes of strobe generation. More particularly, the conditions $\bar{A}$ and $\bar{E}$ correspond to detection of the trailing edge of the character segment at the upper and lower segments thereof; since some characters having these segments also have rounded corners at these locations, erroneous state sensing thereof may frequently occur.

With respect to the differentiation function, for example, when the state A changes from false to true, the corresponding differentiator produces a positive going output pulse, or spike, at the corresponding output. The output pulse is applied to the OR gate 46. Similarly, a change in either of the conditions B or $\bar{B}$ produces a positive going spike from their corresponding differentiators.

OR gate 46 functions to apply any input spike thus received from the differentiators through an inverter 47 to a first input of a NOR gate 48. The U state signal is applied to the second input of the NOR gate 48 and the output thereof is applied to a timing circuit 49. The timing circuit responds to an input from the NOR gate to generate, a predetermined time after receipt thereof, a strobe pulse of predetermined duration.

In operation, and in the absence of a change in the condition of any of the selected sensor output conditions, the output of the OR gate 46 is a logic "0" and thus the inverter 47 supplies a logic "1" to NOR gate 48, maintaining it disabled. Further, in any interval between characters, the U state is a logic "1" and thus maintaining NOR gate 48 disabled. Utilizing the U state in this manner assures that spurious signals will not result in generation of a strobe pulse during the space interval or state when no character segment can be sensed. Conversely, when U is false and, further, a change in condition occurs, causing a corresponding change in state, the inputs to the NOR gate 48 will both be logic "0's" and the NOR gate will be enabled to in turn trigger the timing circuit 49. A predetermined time thereafter, the timing circuit generates the strobe pulse.

The time interval of delay in generation of the strobe pulse is selected with regard to the speed of the movement of the characters past the scanning means and the thickness or width of the vertical segments of the characters, such that the logic decoder gates are enabled at a time which assures that the condition inputs thereto have stabilized. In the case of reading embossed credit cards, the strobe would be timed to assure that the sensor elements have all had time to engage and be setting at the maximum height or central position of the embossed character segments in their line of scan. Thus, for example, imperfections or irregularities in the precise structure of the leading edge of the embossed character segments, and an extent of skew of the characters and their segments will be tolerated by delaying the time of response to the output conditions of sensors; likewise, spurious signals due to transients and contact bounce will be ignored by providing the delay time interval during which the conditions can stabilize, prior to effecting decoding at the time of the strobe pulse.

Figure 9:
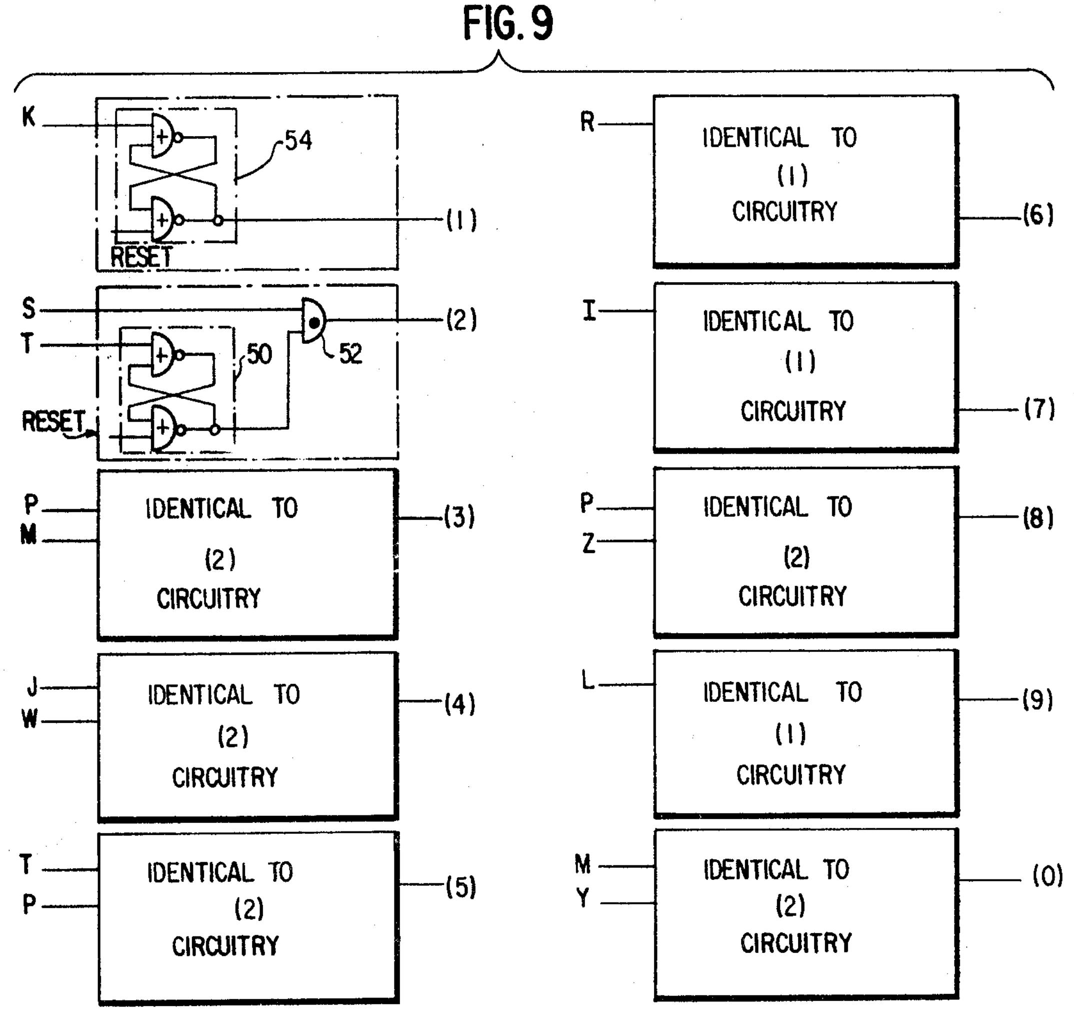
FIG. 9 shows character recognition logic gates responsive to the state outputs of the decoders of FIG. 7 and which are individually operable to process logic states in a prescribed sequence as derived in scanning unknown characters for identifying the scanned character as one of a set of known characters.

In FIG. 9 is shown a plurality of character recognition logic circuits and particularly a logic circuit associated with each of the numerals which the system is designed to identify, here, the numerals "1" through "9" and "0." From the table of states in FIG. 3, it will be recalled that only one or two sets of conditions have been selected, and thus a corresponding number of states in the prescribed sequences are provided.

The logic circuitry for the numeral "2" is an example of a two sequential state logic circuit. More specifically, the logic circuit for recognizing the numeral 2 includes a first storage device 50 which may comprise a conventional bistable flip-flop, and an AND gate 52. Again, recalling the state table of FIG. 3, the sequence of states TS corresponding to the two selected sets, which in turn are the first and third sets of conditions defined by the character "2," identify the character "2." The first storage circuit 50 thus is set by a T input and produces a set output providing a first enable pulse to AND gate 52. If the state S is subsequently received, AND gate 52 is enabled and an output signal is produced identifying the numeral "2." Note that the specified states, I and S, must be derived and must occur in that sequence to achieve identification.

The logic circuitry identifying the numeral "1" requires only the single state K to be identified, and thus an output from the K state defining gate of FIG. 7 actually uniquely identifies the numeral "1." However, for assuring more reliable response to that output, there is provided a logic recognition gate including a single storage device 54. Thus, in response to the state K, the device 54 is set and produces an output signal identifying the scanned character as the numeral "1."

As is indicated in FIG. 9, the logic circuitry for identifying the numerals "6," "7," and "9" is identical to that for the numeral "1," and the circuitry for the remainder of the numerals is identical to the two stage circuitry for the numeral "2." Each logic circuit, however, receives as inputs the states as defined in the table of FIG. 3 and as produced by the decoding circuits of FIG. 7.

Figure 10:
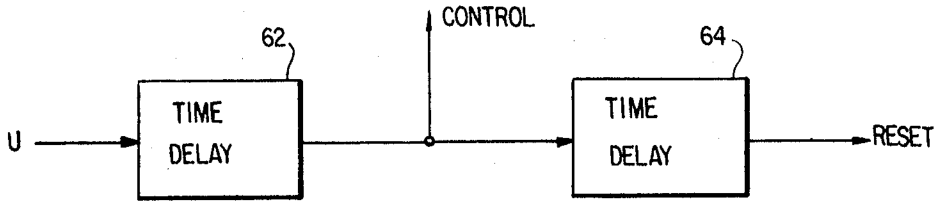
FIG. 10 shows a block diagram of control circuitry utilized in the system of the invention.

Upon completion of recognition of a character, it is apparent that all of the sensors will return to sensing a background level and thus the condition $\bar{A}\ \bar{B}\ \bar{C}\ \bar{D}\ \bar{E}$ will be obtained, resulting in the state U. The U state affords a convenient signal for synchronization and control functions. As shown in FIG. 10, the signal U is applied to two series connected time delay circuits 62 and 64, the output of the first circuit 62 providing a control signal and the output of the second delay circuit 64 providing a reset signal. The duration of the time delay of circuit 62 may be selected as desired to assure that the logic processing of the logic recognition gates of FIG. 9 is completed prior to generation of the control signal.

The time delayed control output derived from the U state signal and produced by delay circuit 62 may be utilized for a number of purposes. For example, temporary storage of the outputs identifying one or more scanned characters may be provided, such as a shift register or other suitable apparatus. The control output may provide for sequentially shifting a signal representative of a recognition signal through successive stages as further characters are identified.

The further delayed reset pulse produced by time delay 64 is used to reset all of the character recognition logic. The time delay produced by time delay 64 assures that any transfer of data initiated by the control pulse has been completed before the temporary character storage elements are reset in preparation for recognition of the next succeeding character.

In accordance with the specific font style disclosed herein and in fact, with most font styles of the type designed for automated reading, all characters of a set are of the same height, and each character includes either a vertical line or a combination of vertical and horizontal line segments which define a continuous line throughout that height. As a result, every sensor must establish a true output condition in the course of scanning a character. In the event that one or more sensors does not, a malfunction has occurred and erroneous recognition results may obtain.

Figure 11:
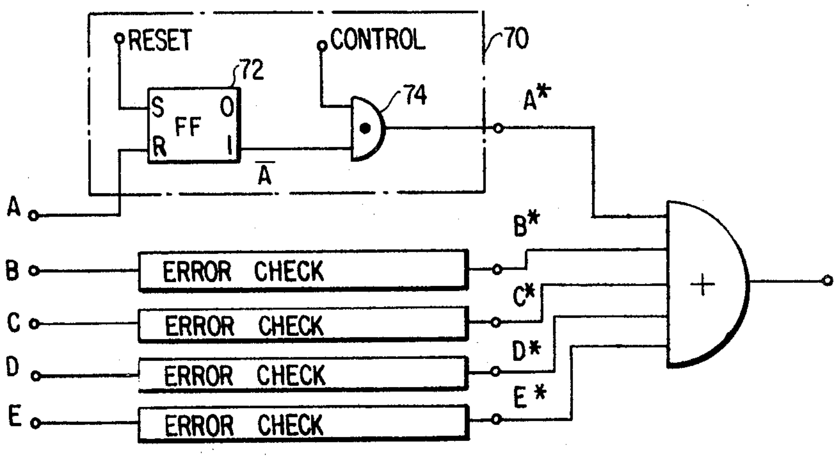
FIGS. 11 and 12 show logic block diagrams of error checking and alarm circuits in accordance with the system of the invention.

FIG. 11 shows a schematic block diagram of an error check circuit for detecting this type of error, and which may be readily implemented in the system of the invention. There are illustrated error check circuits respectively associated with the output conditions A, B, C, D, and E. Since the circuits may be identical, the circuit is shown in detail only for the condition A, as the circuit 70.

The error check circuit for the A condition includes a bistable flip-flop 72 and an AND gate 74, the bistable flip-flop 72 being switched to a set state and producing an output corresponding to the condition $\bar{A}$ in response to each reset pulse. Generation of the reset pulse was explained in relation to FIG. 10. The flip-flop output corresponding to $\bar{A}$ is applied as one input to AND gate 74, the other input comprising the control pulse.

In operation, at the conclusion of each recognition operation, the flip-flop 72 is set by the reset pulse; it will be recalled that the reset pulse is generated subsequently to the control pulse. If, during the course of scanning the next successive character, the condition A remains false, the flip-flop 72 will remain set. Following scanning of the character and when the U, or space state obtains, a shift pulse is generated whereby AND gate 74 is enabled, producing an error output signal A*. On the other hand, if the condition A becomes true at any time in the scanning of a character, flip-flop 72 is reset, the output condition $\bar{A}$ is then false, and AND gate 74 remains disabled. Each of the error outputs A* through E* may actuate corresponding alarm devices or these outputs may be supplied to OR gate 76 to generate a common alarm output.

Figure 12:
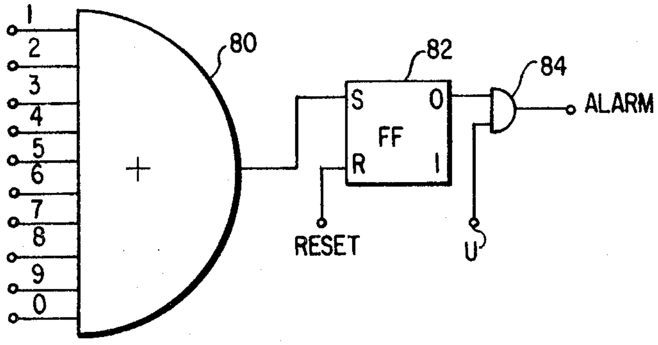

In FIG. 12 is shown a further alarm circuit which is also readily implemented in the system of the invention and establishes the requirement that a character must be recognized between each successive pair of U states. In this context, it will be appreciated that reference to successive pairs of U states implies that a different intervening state has obtained.

In the alarm circuit of FIG. 12, OR gate 80 receives at its inputs the outputs of the logic recognition circuits of FIG. 8, and particularly signals identifying the recognized characters "1" through "9" and "0." The output of OR gate 80 is applied to the set input of a bistable flip-flop 82, the reset output of which is applied to one output of AND gate 82. The reset pulse generated by the circuit of FIG. 10 is applied to the reset input of flip-flop 82 and a signal corresponding to the establishment of the U state is applied to the second input of AND gate 82.

In operation, flip-flop 82 is reset by the reset pulse to provide a first enabling input to AND gate 84. Again, it will be recalled that the reset pulse is generated a time interval subsequent to the U state having first obtained. If sensor outputs are produced but no character is recognized, flip-flop 82 remains reset and upon the subsequent U state obtaining, AND gate 84 is enabled and an alarm output generated. If, however, a character is recognized, and thus one of the inputs 1 through 9 and 0 is true, flip-flop 82 is set by the output of OR gate 80 and AND gate 84 is disabled. Thus, upon the subsequent occurrence of a U state, AND gate 84 remains disabled and no alarm condition results.

Thus, it will be appreciated that the invention provides for dynamically analyzing the character information as it is derived in scanning a character. Particularly, the system responds to the states which are established by the occurrence of selected sets of conditions, and dynamically processes those states concurrently with, and in the sequence of their occurrence in the scanning of the character for effecting recognition. Further, the definition of the states is effected in response to a strobe pulse generated a predetermined time delay subsequent to the first change of a sensor output condition going to establish, ultimately, a change in state. The delay interval assures stabilization of the sensor output conditions prior to responding to that newly defined set for decoding purposes in defining the corresponding state, assuming the set to a selected set. The delayed strobe not only eliminates error due to transients, but also increases the skew tolerance of the system for characters or segments which are not properly aligned, or out of registry.

The sequential processing of the state information provides an inherent check in that not merely the combination of states but also the sequence in which those states appear must be satisfied to achieve recognition. Further, upon occurrence of any state, the processing corresponding to the logic recognition gates immediately establishes the probability of recognition of only a limited number of the set of characters. By selection of the sets of conditions and accordingly defining the corresponding states, it will be appreciated that for at least certain of the characters, the sequence of states required for recognition may in fact comprise but a single state, upon the occurrence of which the character is immediately and uniquely identified. Thus, it is to be understood that reference to sequential processing of the states includes a sequence of a single state in those instances wherein that single state uniquely identifies a corresponding character. In most instances, however, a sequence of at least two states will typically be employed to provide further accuracy and reliability in the recognition operation.

Further, it will be appreciated that the storage techniques employed in the invention provide for the dynamic processing of the states in accordance with required sequences for identification, rather than storage of character information or data as derived from scanning, which stored data is to be employed in a subsequent analysis operation.

In summary, the invention provides a method and system for high speed recognition of characters which is of greatly simplified form in comparison to prior art systems, but which is highly reliable and versatile in operation. The invention is ideally suited for recognizing characters of the type typically employed in embossed credit cards but is, of course, not limited thereto. It is apparent that various modifications may be made in the methods and structures described herein without departure from the scope of the invention. Accordingly, the invention is not to be considered limited by the description but only by the scope of the appended claims.

What is claimed is:

1. In a character recognition method wherein a character to be read is scanned along a plurality of scan paths by a corresponding plurality of sensors, each of which sensors is responsive to and produces output conditions identifying the presence or absence of a character segment in its corresponding scan path and the plurality of simultaneously occurring sensor output conditions defining a set of conditions, each occurrence of a change in the output condition of any sensor defining a further said set of conditions and further there is defined, for each character, a prescribed sequence of states respectively corresponding to at least selected ones of said sets of output conditions as successively defined in scanning that character, each said prescribed sequence of states uniquely identifying the respectively corresponding character as a character of the class, the improvement comprising:

scanning a character with said plurality of sensors, responding to a change in a sensor output condition, wherein the resulting set of conditions includes at least one sensor output condition identifying the presence of a character segment in the corresponding scan path, to produce a condition change signal, producing a strobe signal a predetermined time delay following each occurrence of a condition change signal, said time delay being less than the shortest time duration of any set of output conditions produced in scanning any character of the class, responding to the output conditions of said plurality of sensors produced in scanning a character concurrently with each said strobe signal and in accordance with said selected sets of output conditions, to define corresponding states, and processing each successive state thus defined in scanning a character in accordance with the prescribed sequences of states for uniquely identifying the scanned character as one of the characters of the class to be recognized.

2. An improved method of character recognition as recited in claim 1 wherein certain sensor output conditions of said selected sets are treated as "don't care" conditions.

3. An improved method of character recognition as recited in claim 1 further comprising:

defining a space state in response to the set of output conditions of said plurality of sensors identifying the absence of character segments in all of the scan paths, and responding to a space state to inhibit generation of a strobe signal.

4. An improved method of character recognition as recited in claim 1, further comprising:

responding only to selected output conditions of said plurality of sensors for producing condition change signals, and selecting sets of conditions for defining corresponding states of the prescribed sequences in accordance with each such set including at least one of the output conditions of said plurality of sensors selected for producing condition change signals.

5. An improved method of character recognition as recited in claim 1 further comprising:

selecting a time delay of said strobe signal in accordance with the speed of scan and the width of a character segment lying transverse to the scan path, to effect generation of the strobe signal when the sensors are positioned, on the average, midway of the width of such transverse character segments.

6. An improved method of character recognition as recited in claim 1 further comprising:

recognizing the initiation of each successive set of output conditions produced in scanning a character by responding to the change in output condition of a sensor of said plurality thereof first effecting such a change, responding to the output conditions of said plurality of sensors a predetermined time interval following each said first sensor output condition change initiating each of said successive sets of conditions and in accordance with said selected sets of output conditions, to define corresponding states, and processing each successive state thus defined in scanning a character in accordance with the prescribed sequences of states for uniquely identifying the scanned character as one of the characters of the class to be recognized.

7. In a method of character recognition for recognizing characters embossed on a medium and utilizing a plurality of aligned electromechanical sensors individually actuatable and normally urged to a first position corresponding to the background of said medium for producing a first output condition and moved to a second position in response to engaging the segments of the embossed characters to produce a second output condition, and wherein logic means respond to at least selected sets of said output conditions to define corresponding states and further logic means establish prescribed sequences of states uniquely identifying each character of a class to be recognized and process the succession of states defined by the selected ones of the sets of output conditions produced in the scanning of each character for generating an output identifying the scanned character, the improvement comprising:

scanning each character in a given direction of scan with the plurality of sensors aligned transversely to the scan direction for responding to each successive, new combination of character segments presented to the transversely aligned sensors in effecting a scan of a character, and thereby identifying successive sets of output conditions of said sensors for each scanned character, responding to the first occurring change in output condition of any of said sensors resultant from movement thereof from one to the other of said positions in scanning each character for recognizing the initiation of the resulting set of output conditions of said sensors, for each such first occurring change in a sensor output condition and the respectively associated, resulting set of conditions, in succession, and responding, a predetermined time interval following each said first occurring change in output condition, to the respectively associated resulting set of output conditions produced, in succession, in scanning each character to define as to the said selected sets of output conditions, the corresponding succession of states.

8. The method of character recognition as recited in claim 7 further comprising selecting the predetermined time interval in accordance with the speed of scan of said sensors relative to said characters and the minimum width of any character segment lying transverse to the scan path, to enable response to the output conditions of said plurality of sensors when said sensors are, on the average, positioned midway of the width of the character segment.

9. The method of character recognition as recited in claim 7 wherein said sensors normally engage the surface of the medium from which the embossed characters are raised and are deflected upon engaging the raised segments of each character, each such segment of the character lying transverse to the direction of scan being of finite width, further comprising the steps of:

responding to the first occurring change in output condition of the one of said plurality of sensors first moving between positions in response to scanning either the leading or trailing edge of an embossed character segment in its scan path and which change identifies the initiation of a resulting, successive set of conditions, and selecting a time interval such that all of said sensors which are moved to the second position by engaging a transverse segment are located, on the average, midway of the width of the transverse embossed character segment in their respective scan paths and those which are moved to the first position are engaging the background of the medium.

10. In a character recognition system wherein a character to be read is scanned along a plurality of scan paths by a corresponding plurality of sensors, each of which sensors is responsive to and produces output conditions identifying the presence or absence of a character segment in its corresponding scan path, and wherein a change in the output condition of any sensor defines a new set of output conditions of said plurality of sensors and there furthermore is provided means responsive to at least selected sets of output conditions for defining corresponding states and logic recognition means establishing a prescribed sequence of states uniquely identifying each character of a class to be recognized, said logic recognition means processing the successive states defined by said state defining means during scanning of a character in accordance with said prescribed sequences of states for identifying the scanned character, the improvement comprising:

means responsive to a change in the output condition of one of said plurality of sensors wherein the resulting, new set of output conditions includes at least one sensor output condition identifying the presence of a character segment in the scan path thereof, to produce a condition change signal, delay means responsive to said condition change signal to produce a strobe signal a predetermined time interval following each occurrence of a condition change signal, defining a further said set of conditions, and said state defining means is normally disabled and is enabled by each said strobe signal to respond to said sets of output conditions.

11. The improvement in a character recognition system as recited in claim 10 wherein:

said state defining means defines a space state in response to the set of output conditions of said plurality of sensors identifying the absence of character segments in all of the scan paths, and said strobe signal producing means is inhibited from generating a strobe signal by each space state output of said space state defining means.

12. The improvement in a character recognition system as recited in claim 10 wherein said means for producing a condition change signal comprises:

means respectively associated with the outputs of said sensors for producing a pulse of short duration in response to a change in at least selected ones of said output conditions thereof, and gate means responsive to the outputs of said pulse producing means for producing a condition change signal in response to the first such pulse from any of said pulse producing means for each successive set of output conditions.

13. The improvement in a character recognition system as recited in claim 12 wherein said means for producing short duration pulses comprise differentiators.

14. The improvement in a character recognition system as recited in claim 13 wherein said time delay means establishes a time interval of a duration related to the speed of relative movement of said sensors and said characters, as the latter scan said characters, and to the width of the character segments lying generally transverse to the direction of motion such that said strobe signal is generated when said plurality of sensors is scanning, on the average, the midposition of each such transverse character segment with respect to its width.

15. In a character recognition system wherein a character to be read is scanned along a plurality of scan paths by a corresponding plurality of sensors, each of which sensors is responsive to and produces output conditions identifying the presence or absence of a character segment in its corresponding scan path, and wherein a change in the output condition of any sensor defines a new set of output conditions of said plurality of sensors, the improvement comprising in combination:

means responsive to a change in the output condition of one of said plurality of sensors wherein the resulting, new set of output conditions includes at least one sensor output condition identifying the presence of a character segment in the scan path thereof, to produce a condition change signal, means responsive to said condition change signal to produce a strobe signal a predetermined time delay following each occurrence of a condition change signal, and means responsive to the output conditions of said plurality of sensors and to the strobe signals for defining states corresponding to at least selected sets of said output conditions of said sensors produced at the times of the strobe signals, and logic recognition means establishing a prescribed sequence of states uniquely identifying each character of a class to be recognized, said logic recognition means being responsive to said state defining means for processing the states, as successively defined by said state defining means during scanning of a character, in accordance with said prescribed sequences of states for identifying the scanned character.

16. The improvement in a character recognition system as recited in claim 15 wherein:

said state defining means defines a space state in response to the set of output conditions of said plurality of sensors identifying the absence of character segments in all of the scan paths, and said strobe signal producing means is inhibited from generating a strobe signal by each space state output of said space state defining means.

* * * * *